United States Patent Office 3,671,075
Patented June 20, 1972

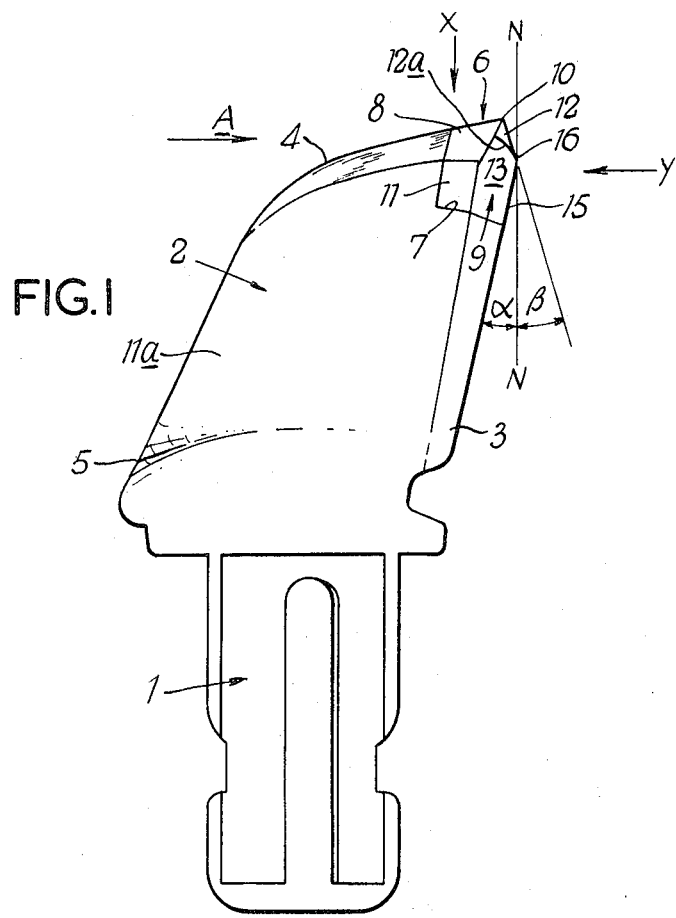
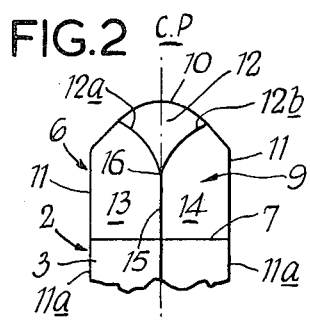
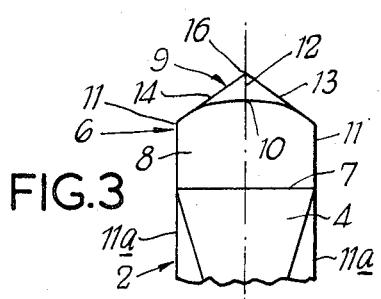

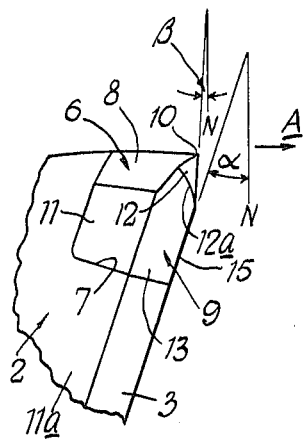
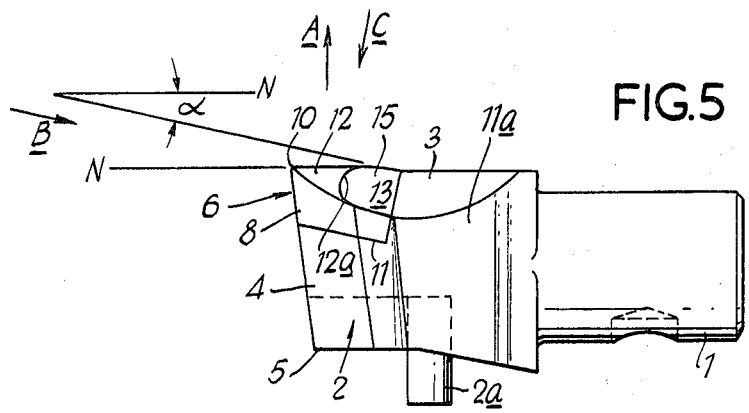
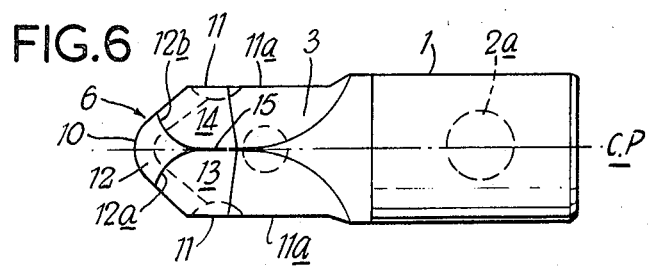

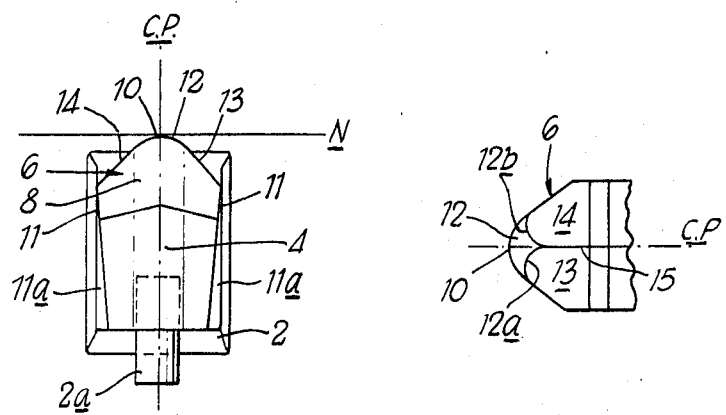
FIG.7  FIG.8
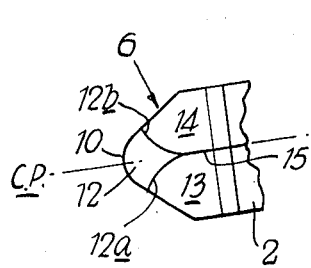
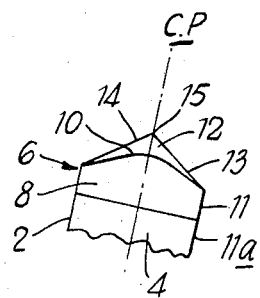
FIG.9  FIG.10

3,671,075
CUTTER PICKS
Brian Eyre, Sheffield, and John Bland, Epping, England, assignors to Padley & Venables Limited and Sir Robert McAlpine & Sons Limited
Filed Dec. 7, 1970, Ser. No. 95,863
Claims priority, application Great Britain, Dec. 30, 1969, 63,184/69
Int. Cl. *E21c 35/18*
U.S. Cl. 299—79                                           11 Claims

ABSTRACT OF THE DISCLOSURE

A cutter pick having a head carrying an insert of hard material and having a longitudinally extending shank by which it is removably held in a pick box for transversing movement in a longitudinally extending cutting plane of the pick; the insert has a convex top face and a face which is intended to lead during traversing movement of the pick which leading face comprises a convex front face part and an intermediate face part, the latter being formed by relieving the corner portion of the insert where the front face part and top face would normally intersect; the insert has a top edge constituted by the line of junction between the leading face and the top face; the intermediate face part is set by a side which coincides with the top edge and by a front edge part constituted by at least one line of junction between the intermediate face part and the front face part; and the front face part has a positive rake angle in the cutting plane and the intermediate face part has a rake angle in the cutting plane which is less than the rake angle in the cutting plane of the front face part.

---

This invention relates to cutter picks. More particularly the invention is concerned with cutter picks for use in the mining of mineral as, for example, coal. It is to be understood however, that the cutter pick of the invention may, advantageously, be used in the cutting or scabbling of concrete, rock, macadamized surfaces and other hard mineral substances and the term "cutter pick" as used throughout this specification is intended to include picks for such use.

Cutter picks for mineral mining generally comprise a cutting head and a shank by which the pick is capable of being removably held in a pick box or holder generally carried by a rotatable drum or cutter chain of mineral mining apparatus. The cutting head projects from the pick box so as to operate in the mineral face by traversing movement of the pick during movement of the chain or drum. The cutting head has front (leading) and top faces which are constituted wholly, or in part, by an insert of tungsten carbide or other suitable hard material extending over the junction of the front and top faces.

The pick may have twin back-to-back cutting heads each of which has front and top faces which are constituted wholly or in part by a hard material insert as above described.

A pick of the kind above mentioned is disclosed in British patent specification No. 767,324 in which the hard material insert is provided with an apical leading cutting point at the junction of the front and top faces. Although the pick in specification 767,324 has become widely accepted, particularly in the coal mining industry, and provides efficient cutting it has been found that the apical leading cutting point is itself a very weak geometric form highly susceptible to wear and damage.

It is an object of the present invention to provide a cutter pick having an improved construction for its hard material insert by which the pick may provide efficient cutting and the insert be less susceptible to wear and damage than inserts of hitherto proposed cutter picks of the kind above referred to.

By the present invention there is provided a cutter pick having a head carrying an insert of hard material and having a longitudinally extending shank by which it is capable of being removably held in a pick box to exhibit traversing movement in a longitudinally extending cutting plane of the pick; wherein the insert has a convex top face and a face which is intended to lead during traversing movement of the pick which leading face comprises a convex front face part and an intermediate face part; the intermediate face part being formed by relieving the corner portion of the insert where the front face part and top face would normally intersect; the insert having a top edge constituted by the line of junction between the leading face and the top face and, the intermediate face part being bounded by a side which coincides with the top edge and by a front edge part constituted by at least one line of junction between the intermediate face part and the front face part; and wherein, the front face part has a positive rake angle in the cutting plane and the intermediate face part has a rake angle in the cutting plane which is less than the rake angle in the cutting plane of the front face part.

The term rake angle is well known in the art of cutter picks and, as used throughout this specification the term "positive rake angle" when applied to a surface or edge in the leading face of the cutter pick means that, when the pick is mounted for traversing movement in mining machinery, the line in the surface, or the edge, in the cutting plane is inclined at such an angle (the rake angle) that a point on that line or edge which is at, or nearest to, the top edge of the cutter pick is the first part of that line or edge to intersect a plane substantially perpendicular to the direction of travel of the pick; conversely the term "negative rake angle" means that the line in the surface, or the edge, in the cutting plane is inclined at such an angle (the rake angle) that a point on that line or edge which is furthest from the top edge is the first part of that line or edge to intersect a plane substantially perpendicular to the direction of travel of the pick.

In the context of the present invention it will be appreciated that a positive rake angle will always be greater than a negative rake angle irrespective of the numerical values for the respective rake angles.

The top face, whilst of convex shape, should comprise one curved surface, the cross section being a fair curve, preferably arcuate.

Preferably the front fact part has two surfaces which form a front cutting edge in the cutting plane which edge has a positive rake angle. The two surfaces of the front face part may be flat or curved but it is preferred that they are flat to provide a V-shaped bevel at each side of the front cutting edge. Alternatively the front cutting edge may be rounded off so that the leading face effectively consists of two surfaces, that is to say the intermediate face part and the front face part which latter part appears continuous but is generally convex. When the front face part is a fair curve in lateral section, the front edge will be a fair curve (i.e. a single line of junction) which may, for example, be parabolic, arcuate, hyperbolic or elliptical.

The side of the intermediate face part which coincides with the top edge may be shorter than, be co-extensive with, or be longer than the top edge.

Although the intermediate face part may have a positive rake angle in the centre plane which is less than the positive rake angle in the cutting plane of the front face part, or may have zero rake angle in the cutting plane, preferably it has a negative rake angle in the cutting plane.

By providing a front cutting edge in the front face part (which is preferably V-shaped), the intermediate face part may be bounded by three sides so that it is substantially triangularly shaped and has the front cutting edge extending from an apex of the triangle. With a negative rake angle for the triangularly shaped intermediate face part, the pick will have a leading point formed at the junction of the front cutting edge and two front edges of the triangular shape. This leading point is preferably located substantially centrally in the leading face.

The intermediate face part is continuous and may be substantially flat. Preferably however, the intermediate face part is convex and of substantially arcuate profile. Such arcuate profile conveniently forms part of a notional cylinder having an axis located in the cutting plane and inclined at the rake angle in the cutting plane of the intermediate face part.

Preferably the intermediate face part, the front face part and the top face are substantially symmetrical about the cutting plane of the pick.

By providing the convex and substantially arcuate top face and a three sided, substantially triangularly shaped intermediate face part in the leading face it is believed that, during use for cutting a mineral face the relatively large area of the arcuate top face which comes into contact with the mineral reduces the initial rate of wear on the exposed top face and top edge of the cutting insert. Furthermore the intermediate face part and its rake angle ensures that considerable strength is retained for the hard material of the insert at the junction of the leading and top faces without decreasing the cutting efficiency in comparison with hitherto proposed mineral mining picks.

Several embodiments of the present invention will now be described, by way of example only, with reference to the accompanying illustrative drawings in which:

FIG. 1 is a side elevation of a cutter pick constructed in accordance with the present invention in which the intermediate face part of the hard material insert is provided with a negative rake angle and is substantially triangularly shaped;

FIG. 2 shows a scrap end view of the part of the pick having the insert taken in the direction of arrow Y in FIG. 1;

FIG. 3 is a plan of the part of the pick having the insert taken in the direction of arrow X in FIG. 1;

FIG. 4 is a side elevation of part of a cutter pick similar to that shown in FIG. 1 and which shows the hard material insert modified to provide a triangularly shaped intermediate face part having a positive rake angle;

FIGS. 5 to 10 illustrate a further embodiment of a cutter pick constructed in accordance with the present invention in which the intermediate face part of the hard material insert is substantially triangularly shaped having zero rake angle and of which FIG. 5 is a side elevation of the pick;

FIG. 6 is an end elevation and shows the leading face;

FIG. 7 shows the pick in plan to illustrate the top face and edge;

FIG. 8 is a scrap view and shows the leading face and insert as viewed in the direction of arrow A in FIG. 5;

FIG. 9 is a plan of the insert to show the leading face; and

FIG. 10 is a scrap view to show the top and leading faces of the insert as viewed in the direction of arrow B in FIG. 5.

Where possible throughout the following description, the same parts or members in each of the figures have been accorded the same references.

Referring particularly to FIGS. 1 to 3, the cutter pick comprises a longitudinally extending shank 1 which is substantially rectangular in lateral section and carries, integrally therewith and in coplanar relation thereto, a single cutting head 2. The head 2 has a front face 3 and a top face 4. The front face 3 is inclined outwardly from the shank 1 and is bevelled at each side to form a V-shaped profile which is intended to lead during use of the pick. The pick is intended to be mounted in a pick box (not shown) to traverse and exhibit cutting movement in the direction of arrow A.

The top face 4 of the head 2 is inclined downwardly towards the rear side 5 of the head. The front and top faces 3, 4 are symmetrical about a longitudinally extending cutting plane CP of the pick, in which cutting plane the pick is intended to exhibit traversing and cutting movement.

The head 2 carries a cutting insert 6 of hard material (such as tungsten carbide) which is mounted and secured, conveniently by brazing, in a rebate 7 opening into both the front and top faces 3, 4 of the head 2. The insert 6 has a top face 8 and a leading face shown generally at 9 which are shaped to be continuous with the top and front faces respectively of the head 2. The leading face 9 is adapted to lead in traversing movement of the pick and forms a line of junction with the top face 8 at a top edge 10. The top face 8 and top edge 10 have a convex substantially arcuate profile (see FIG. 2) which, as above mentioned, is continuous over the adjacent part length of the top face 4 of the head 2.

The insert 6 has cheeks or side faces 11 which are flush with the cheeks or side faces 11a of the head 2.

The leading face 9 of the insert has three surfaces 12 to 14 (see FIG. 2) which are symmetrical about the cutting plane CP and of which the surface 12 forms an intermediate face part and the surfaces 13 and 14 form a front face part. The surfaces 13 and 14 are substantially flat and form a V-shaped front cutting edge 15 so that the front face 9 is bevelled at each side. The intermediate face part 12 is formed by relieving the corner portion of the insert where the front face part 13, 14 and top face 8 would normally intersect and is defined by three sides to be of substantially triangular shape. One of the sides of the intermediate face part 12 coincides with, and is shorter than, the top edge 10 whilst the other two sides 12a, 12b of the intermediate face part provide front edges at their respective lines of junction with the surfaces 13 and 14. The front cutting edge 15 extends from the apex of the intermediate face part 12 which is remote from the top edge 10 and the front face 3 of the head 2 is bevelled to be continuous with the surfaces 13 and 14.

The front cutting edge 15 has a positive rake angle (as indicated by the angle $\alpha$) in the plane CP with respect to a neutral plane N which is perpendicular to the direction of pick movement, arrow A. The intermediate face part 12 has a negative rake angle (as indicated by the angle $\beta$) in the plane CP and with respect to the neutral plane N.

Although the intermediate face part 12 may be substantially flat it is preferably of convex and substantially arcuate profile. Conveniently the face part 12 is part cylindrical and lies in the surface a notional cylinder the axis of which lies in the cutting plane CP and is inclined at the rake angle $\beta$ with respect to the neutral plane N. Such part cylindrical form of the intermediate face part is indicated by the two concave front edges 12a, 12b which partly define the surface 12 in FIG. 2.

As will be apparent from FIG. 1, by providing positive rake for the front cutting edge 15 and negative rake for the intermediate face part 12, the pick shown in FIGS. 1 to 3 has a leading point 16 of considerable strength. In use, the leading point 16 first penetrates the mineral face whilst the geometric form of the top edge 10 renders this edge strong and provides a reduction in the initial rate of wear on the insert due to the cleavage effect provided by the intermediate face part 12 and the V-shaped front cutting edge 15 presented by the front face part 13, 14.

In the embodiment shown in FIG. 4, the front cutting edge 15 of the insert 9 has a positive rake angle $\alpha$ but the intermediate face part 12 has a smaller positive rake angle $\beta$ so that in use the arcuate top edge 10 first contacts the mineral face, a shearing action is provided over the triangularly shaped intermediate face part and thereafter the front cutting edge 15 cleaves through the mineral.

In the embodiment illustrated in FIGS. 5 to 10, the head 2 carries a cylindrical pin 2a which extends rearwardly and may be used to facilitate extraction of the pick from its holding box (not shown). The insert 6 is of substantially the same shape as that above described with reference to FIGS. 1 to 3 but is mounted in the head 2 so that the front cutting edge 15 forms a positive rake angle $\alpha$ with the neutral plane N whilst the triangularly shaped intermediate face part 12 has zero rake angle. The face part 12 is part cylindrical (see FIG. 7) about an axis which lies in the cutting plane CP and is parallel to the neutral plane N so that, in use of the pick, the line of the intermediate face part 12 in the centre plane makes initial contact with the mineral face and thereafter the V-shaped front cutting edge 15 cleaves through the mineral.

In practical constructions of the picks above described and illustrated, that shown in FIGS. 1 to 3 preferably has a positive rake angle $\alpha$ in the range 9° to 15° (preferably 12°) and a negative rake angle $\beta$ in the range 5° to 25° (preferably 17°); the pick shown in FIG. 4 preferably has a positive rake angle $\alpha$ of the same range as in FIGS. 1 to 3 and a positive rake angle $\beta$ greater than 0° and less than 8° (preferably 5°); and the pick shown in FIGS. 5 to 10 preferably has a positive rake angle $\alpha$ in the range 9° to 15° (preferably 12°).

We claim:

1. A cutter pick having a head carrying an insert of hard material and having a longitudinally extending shank by which it is capable of being removably held in a pick box to exhibit traversing movement in a longitudinally extending cutting plane of the pick; wherein the insert has a convex top face and a face which is intended to lead during traversing movement of the pick which leading face comprises a convex front face part and an intermediate face part; the intermediate face part being formed by relieving the corner portion of the insert where the front face part and top face would normally intersect and having a convex profile which is part cylindrical and lies in the surface of a cylinder having its axis located in the cutting plane; the insert having a top edge constituted by the line of junction between the leading face and the top face, and the intermediate face part being bounded by a side which coincides with the top edge and by a front edge part constituted by at least one line of junction between the intermediate face part and the front face part; and wherein, the front face part has a positive rake angle in the cutting plane and the intermediate face part has a rake angle in the cutting plane which is less than the rake angle in the cutting plane of the front face part.

2. A cutter pick as claimed in claim 1 wherein the intermediate face part, the front face part and the top face are substantially symmetrical about the cutting plane of the pick.

3. A cutter pick as claimed in claim 1 wherein the top face comprises one curved surface, the cross section of which is a fair curve.

4. A cutter pick as claimed in claim 1 wherein the axis of said part cylindrical surface is inclined at the rake angle in the cutting plane of the intermediate face part.

5. A cutter pick as claimed in claim 1 wherein the intermediate face part has a negative rake angle in the cutting plane.

6. A cutter pick as claimed in claim 1 wherein the intermediate face part has zero rake angle in the cutting plane.

7. A cutter pick as claimed in claim 1 wherein the intermediate face part has a positive rake angle in the cutting plane whereby the top edge of the insert is intended to first contact a mineral face during use of the pick.

8. A cutter pick as claimed in claim 1 wherein the front face part comprises two surfaces which form a front cutting edge in the cutting plane which front cutting edge has a positive rake angle.

9. A cutter pick as claimed in claim 8 wherein each of the two surfaces of the front face part is flat to provide a V-shaped bevel at each side of the front cutting edge.

10. A cutter pick as claimed in claim 8 wherein the intermediate face part is bounded by three sides to be substantially triangular in shape; two of said sides providing front edges at lines of junction between the intermediate face part and the front face part and terminating at an apex of the intermediate face part remote from the top edge and wherein the front cutting edge extends from the said apex.

11. A cutter pick as claimed in claim 10 wherein the intermediate face part has a negative rake angle in the cutting plane and in which the said apex of the intermediate face part constitutes a leading point of the insert and is located substantially centrally in the leading face of the insert.

References Cited

FOREIGN PATENTS 735,328   5/1966   Great Britain _____ 299—79

ERNEST R. PURSER, Primary Examiner